US010607456B1

(12) United States Patent
Benkreira et al.

(10) Patent No.: US 10,607,456 B1
(45) Date of Patent: Mar. 31, 2020

(54) NETWORK-TETHERABLE AUTOMATED TELLER MACHINE

(71) Applicant: Capital One Services, LLC, McLean, VA (US)

(72) Inventors: Abdelkader M'Hamed Benkreira, New York, NY (US); Michael Mossoba, Arlington, VA (US); Joshua Edwards, Philadelphia, PA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/415,101

(22) Filed: May 17, 2019

(51) Int. Cl.
*G07F 19/00* (2006.01)
*G06Q 20/32* (2012.01)

(52) U.S. Cl.
CPC ....... *G07F 19/211* (2013.01); *G06Q 20/3278* (2013.01); *G07F 19/202* (2013.01); *G07F 19/206* (2013.01); *G07F 19/207* (2013.01)

(58) Field of Classification Search
CPC .... G07F 19/20; G07F 19/201; G06Q 20/1085
USPC ........................................................ 235/379
See application file for complete search history.

(56) References Cited

U.S. PATENT DOCUMENTS

| 2011/0238573 | A1* | 9/2011 | Varadarajan | G06Q 20/1085 705/43 |
| 2012/0239572 | A1* | 9/2012 | Wolfs | G06Q 20/20 705/44 |
| 2015/0112862 | A1* | 4/2015 | Kheradpir | G06F 21/313 705/44 |
| 2017/0346711 | A1* | 11/2017 | Jones-McFadden | H04L 47/803 |

* cited by examiner

*Primary Examiner* — Ahshik Kim
(74) *Attorney, Agent, or Firm* — DLA Piper LLP (US)

(57) ABSTRACT

According to one aspect of the present disclosure, a method for improved reliability in a bank computer network can include: identifying an ATM proximate to a user device; determining whether the user device is communicably coupled to a server device over a secure link, the server device hosted by a financial institution and capable processing ATM transactions; establishing a secure link with the server device in response to determining the user device is not communicably coupled with the server device; prompting a user for permission to tether with the ATM in response to determining the user device is communicably coupled with the server device or determining the secure link has been established; receiving an indication of a response to the prompt for permission to tether with ATM; and establishing a P2P connection between the ATM and the user device.

18 Claims, 6 Drawing Sheets

NETWORK-TETHERABLE AUTOMATED TELLER MACHINE

BACKGROUND

Automated Teller Machines (ATMs) allow bank customers ("users") to withdraw money, deposit money, and perform other transactions. Many ATMs are connected to interbank networks, enabling users to withdraw and deposit money from machines not belonging to the bank where they have their accounts or in the countries where their accounts are held. ATMs may rely on authorization of a financial transaction by a card issuer or other authorizing institution on a communications network.

ATMs can connect to a remote server device—sometimes referred to as a ATM "host" or "controller"—using various types of network links, including virtual private networks (VPNs) over high-speed internet connections, leased lines, or plain old telephone service (POTS) lines. Most (or all) of an ATM's functionality may be unavailable when the network link is severed or degraded.

SUMMARY

According to one aspect of the present disclosure, a method for improved reliability in a bank computer network can include: identifying an automated teller machine (ATM) proximate to a user device; determining whether the user device is communicably coupled to a server device over a secure link, the server device hosted by a financial institution and capable processing ATM transactions; establishing a secure link with the server device in response to determining the user device is not communicably coupled with the server device; prompting a user for permission to tether with the ATM in response to determining the user device is communicably coupled with the server device or determining the secure link has been established; receiving, via an input device, an indication of a response to the prompt for permission to tether with ATM; and establishing a secure peer-to-peer (P2P) connection between the ATM and the user device in response to the response indicating that a user permits tethering with the ATM. The ATM can be configured to communicate ATM transactions with the server device via the P2P connection.

In some embodiments, identifying the ATM proximate to the user device can include determining that the ATM is unable to communicate with the server device. In some embodiments, identifying the ATM proximate to the user device can include: determining a location of the user device using a location sensor; and identifying one or more ATMs having a known location within a predetermined radius of the location of the user device.

In some embodiments, prompting the user for permission to tether with the ATM can include prompting the user for permission to tether with the ATM for a designated ATM transaction or session. The method may further include detecting completion of the designated ATM transaction or session and terminating the P2P connection in response to detecting completion of the designated ATM transaction or session.

In some embodiments, creating the P2P connection can include creating a P2P Wi-Fi network between the ATM and the user device. In some embodiments, creating the P2P connection can include establishing a Bluetooth connection between the ATM and the user device. In some embodiments, creating the P2P connection can include establishing a USB connection between the ATM and the user device.

In some embodiments, prompting the user for permission to tether with the ATM comprises presenting a preferences user interface (UI) having one or more controls for permitting tethering to the ATM. Receiving the indication of a response to the prompt for permission to tether with ATM can include receiving the indication via the preferences UI.

According to another aspect of the present disclosure, a method for improved reliability in a bank computer network can include: determining, by an automated teller machine (ATM), whether the ATM can communicate with a server device, the server device hosted by a financial institution and capable to perform one or more ATM transactions; in response to determining that the ATM cannot communicate with the server device, establishing a secure peer-to-peer (P2P) connection between the ATM and a user device; and in response to establishing the secure P2P connection, performing an ATM transaction between the ATM and the server device via the secure P2P connection. The user device may be configured to: establish a secure link with a server device; prompt a user for permission to tether with the ATM in response to determining the ATM cannot communicate with the server device; receive, via an input device, an indication of a response to the prompt for permission to tether with ATM; and permit the secure P2P connection to be established in response to the response indicating that the user permits tethering with the ATM.

In some embodiments, the user device may be configured to: determine a location of the user device using a location sensor; identify one or more ATMs having a known location within a predetermined radius of the location of the user device; and identify the ATM from among the one or more identified ATMs. In some embodiments, the method may include detecting completion of the ATM transaction and terminating the P2P connection in response to detecting completion of the ATM transaction.

In some embodiments, creating the P2P connection can include creating a P2P Wi-Fi network between the ATM and the user device. In some embodiments, creating the P2P connection can include establishing a Bluetooth connection between the ATM and the user device. In some embodiments, creating the P2P connection can include establishing a USB connection between the ATM and the user device.

In some embodiments, the user device may be configured to: present a preferences user interface (UI) to the user, the preferences UI comprising one or more controls for permitting tethering to the ATM; and receive the indication of a response to the prompt for permission to tether with ATM via the preferences UI.

According to another aspect of the present disclosure, a system for improved reliability in a bank computer network can include a processor and a non-volatile memory. The non-volatile memory can store instructions that when executed on the processor cause the processor to: identify an automated teller machine (ATM) proximate to a user device; determine whether the user device is communicably coupled to a server device over a secure link, the server device hosted by a financial institution and capable to perform one or more ATM transactions; establish a secure link with the server device in response to determining the user device is not communicably coupled with the server device; prompt a user for permission to tether with the ATM in response to determining the user device is communicably coupled with the server device or determining the secure link has been established; receive, via an input device, an indication of a response to the prompt for permission to tether with ATM; and establish a secure peer-to-peer (P2P) connection between the ATM and the user device in response to the response indicating that a user permits tethering with the ATM. The ATM can be configured to communicate ATM transactions with the server device via the P2P connection.

In some embodiments, the instructions that when executed on the processor cause the processor to determine that the ATM has lost communication with the server device. In some embodiments, the instructions that when executed on the processor cause the processor to: determine a location of the user device using a location sensor; identify one or more ATMs having a known location within a predetermined radius of the location of the user device; and identify the ATM proximate to the user device from the one or more identified ATMs. In some embodiments, the instructions that when executed on the processor cause the processor to detect completion of an ATM transaction performed by the ATM and terminate the P2P connection in response to detecting completion of the ATM transaction. In some embodiments, the instructions that when executed on the processor cause the processor to: presenting a preferences user interface (UI) comprising one or more controls for permitting tethering to the ATM; and receive the indication of a response to the prompt for permission to tether with ATM via the preferences UI.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure relate to systems and methods for improving the reliability and availability of ATMs and bank computer networks. An ATM may rely on connectivity to a server device for the purpose of authorizing transactions. An ATM can lose connectivity to the server device, for example, as a result of physical damage to the ATM's network interface or cabling, or a as a result of a service interruption experience by an internet service provider (ISP). In some embodiments, an ATM that has lost its primary connection to the server device may be configured to "tether" to a user's device, such as a smartphone or tablet, and share the device's Internet connection. An app running on the user's device may control which ATM's are permitted to tether and share the device's connectivity. Embodiments of the present disclosure can allow users to transact with ATMs that have lost connectivity, for example, as a result of hurricanes, floods, or other natural disasters.

Figure 1A:
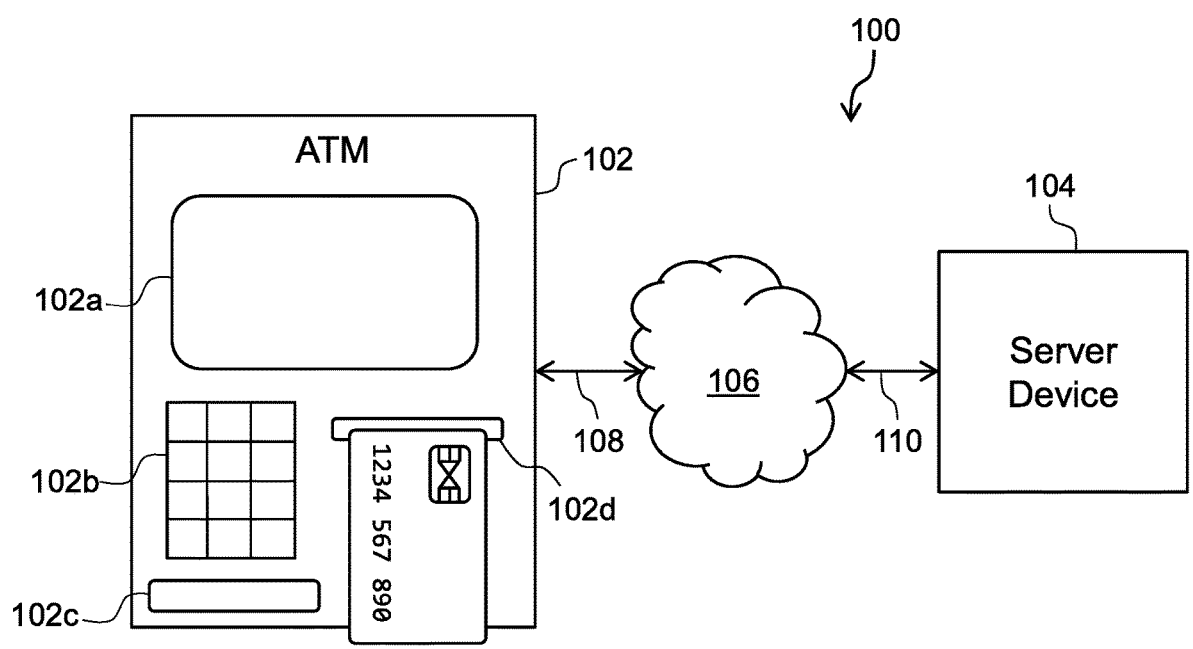
FIG. 1A is a diagram of an illustrative system including an automated teller machine (ATM) connected to a server device via a network, according to some embodiments of the present disclosure.

Referring to FIG. 1A, an illustrative system 100 can include an automated teller machine (ATM) 102 connected to a server device 104 via a first network 106, according to some embodiments of the present disclosure. Although only one ATM 102 is shown in FIG. 1, a skilled artisan will recognize that the system 100 can include a plurality of ATMs each connected to a common server device 104 or a collection of server devices (e.g., a cluster of servers). In some embodiments, server device 104 may be hosted by a financial institution (e.g., CAPITAL ONE™) that provides the disclosed functionality to its customers. Server device 104 may be one of many interconnected physical and/or virtual server devices that form a bank computer network. In some embodiments, server device 104 may be part of an interbank network that enables users to withdraw and deposit money from ATMs belonging to various different banks. In some embodiments, server device 104 may correspond to an ATM host or controller.

ATM 102 and server device 104 may be communicably coupled to first network 106 via respective links 108 and 110. Here, first network 106 may correspond to the Internet or, more particularly, to a VPN established between ATM 102 and server device 104. Each of links 108, 110 may correspond to a wired or wireless network link or connection, such as Ethernet or Wi-Fi connection. In some embodiments, ATM 102 and server device 104 may be connected via a leased line or a POTS line. The connection between ATM 102 and server device 104 illustrated in FIG. 1A (i.e., the path formed by links 108, 110 and first network 106) may be referred to herein as the ATM's "primary" connection to the server device.

As shown in FIG. 1A, an illustrative ATM 102 can include a display device 102a, an input device 102b, a cash-dispensing device 102c, and a card reader 102d, according to some embodiments. In some embodiments, display device 102a and input device 102b may collectively be provided as a touchscreen device. In some embodiments, input device 102b may be provided as a numeric or alphanumeric keypad. ATM 102 may also include a wired or wireless network adapter (not shown) configured to communicate with server device 104 via first network 106.

Figure 1B:
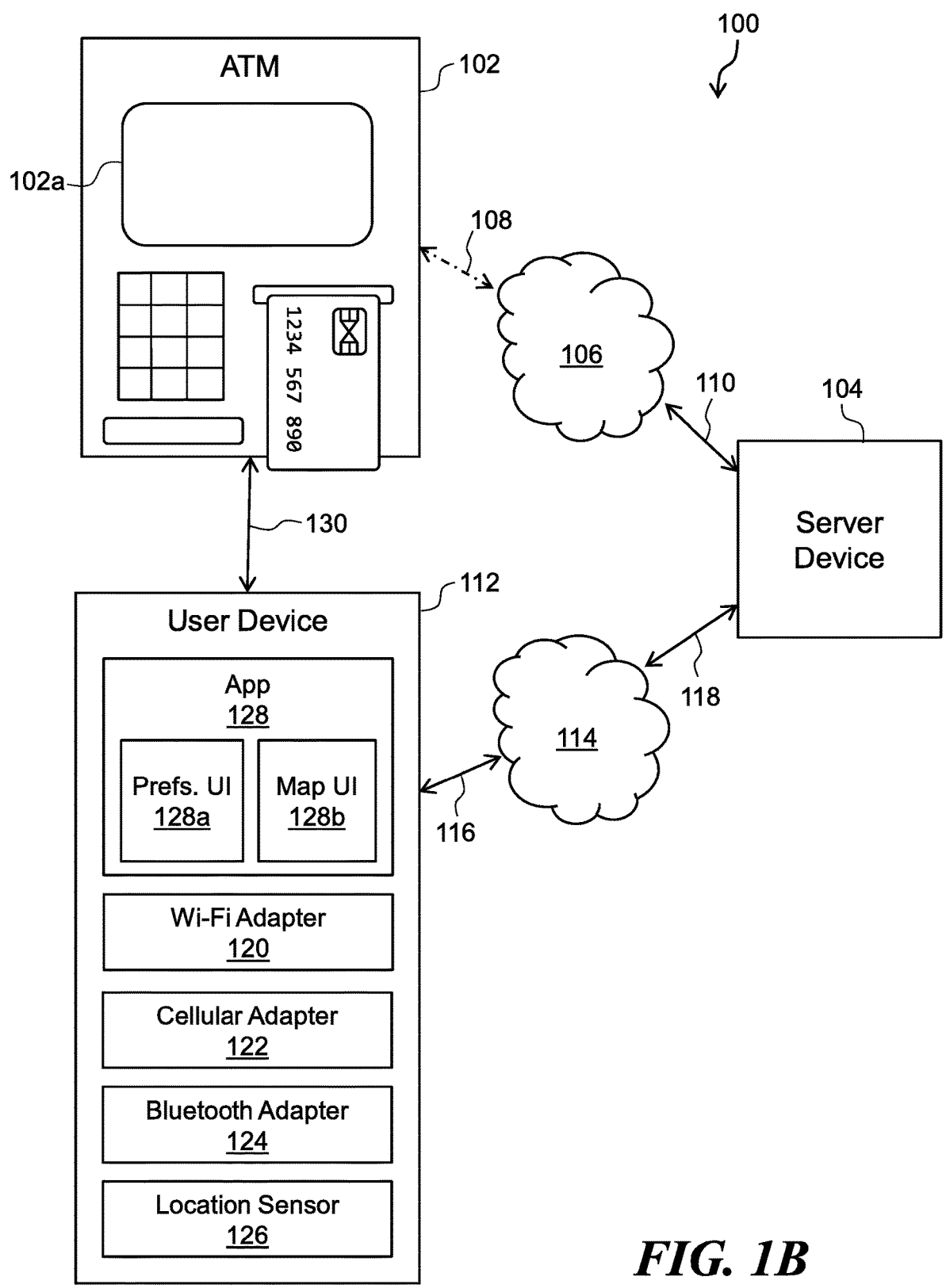
FIG. 1B is a diagram of an illustrative system including an ATM tethered to a user device, and a server device connected to the user device via a network, according to some embodiments of the present disclosure.

FIG. 1B illustrates how ATM 102 can tether to a user device in order to continue functioning when its primary connection is degraded, severed, or otherwise becomes unavailable. For example, ATM 102 may lose its primary connection to server device 104 if the link 108 is physically damaged (as illustrated by dashed line 108 in FIG. 1B). ATM 102 may be referred to herein as being "online" when it has primary connectivity to server device 104, and otherwise referred to as being "offline."

ATM users may have on their persons smartphones, tablets, or other types of user devices. An illustrative user device 112 can include a Wi-Fi adapter 120, a cellular adapter 122, a Bluetooth adapter 124, and a location sensor 126. In some embodiments, location sensor 126 can include a Global Positioning System (GPS) receiver. User device 112 can further include a non-volatile memory and a processor (not shown) configured to respectively store and execute one or more applications (or "apps") 128.

User device 112 may have connectivity to the server device 104 via a second network 114. For example, as shown in FIG. 1B, user device 112 and server device 104 may be communicably coupled to second network 114 via respective links 116 and 118. In some embodiments, user device 112 may connect to second network 114 via a wireless link 116, such as a Wi-Fi connection using Wi-Fi adapter 120, or a cell network using cellular adapter 122.

In some embodiments, first network 106 and second network 114 may correspond to the same physical or logical network, such as the Internet. Here, server device links 110 and 118 may correspond to the same physical or logical network connection, e.g., a high-speed internet connection. In some embodiments, first network 106, along with links 108 and 110, may correspond to a leased line or POTS, whereas second network 114 may correspond to the Internet.

User device 112 may be configured to establish a peer-to-peer (P2P) connection or link 130 with ATM 102. In some embodiments, P2P connection 130 may be a wired connection such as a Universal Serial Bus (USB) link. In some embodiments, P2P connection 130 may be a wireless connection, such as a Bluetooth connection established by Bluetooth adapter 124, or a P2P Wi-Fi network established using Wi-Fi adapter 120. Once P2P connection 130 is established between ATM 102 and user device 112, user device 112 may be configured to share its network connection 116 with ATM 102. This type of connection sharing may be referred to as tethering or phone-as-modem (PAM).

In some embodiments, an app 128 installed on user device 112 may include a preferences user interface (UI) 128a. Preferences UI 128a can include one or more controls that allows a user to permit tethering for a particular ATM 102, along with controls for entering information needed to establish P2P connection 130. For example, preferences UI 128a may include controls for the user to enter Bluetooth pairing information or Wi-Fi network settings associated with the ATM 102. After the user permits tethering for a particular ATM 102, app 128 may attempt to establish a P2P connection 130 using the provided information.

In some embodiments, app 128 can determine when the user is proximate to (i.e., nearby) a tetherable ATM using location sensor 126. For example, app 128 can receive a list of ATM locations from an external source, such as from server device 104. App 128 can correlate the user's current location—determined using location sensor 126—with the list of ATM locations to determine nearby ATMs. In some embodiments, app 128 may determine that a particular ATM is proximate to the user if the ATM's location is within a predetermined radius of the user device 128. In some embodiments, the predetermined radius is one (1), two (2), three (3), four (4), or five (5) feet. App 128 can also receive, for each nearby ATM, status information including whether the ATM is "online" or "offline," and capabilities information including whether the ATM is capable of tethering. Using this information, app 128 can identify a nearby ATM that is both offline and capable of tethering. If such an ATM is identified, app 128 may prompt the user to permit tethering for that ATM, for example by automatically displaying or opening preferences UI 128a.

In some embodiments, ATM 102 can detect when its primary connection is unavailable and, in response, automatically transition itself to "offline" mode. In this mode, ATM 102 may display tethering instructions to the user via display device 102a. For example, ATM 102 may instruct the user to open a particular app 128 on the user's device 112 and to permit tethering. ATM 102 can display information that the user needs to establish P2P connection 130, such as Wi-Fi network settings or Bluetooth pairing information.

In some embodiments, ATM 102 may be tethered to the user device 112 via a USB link 130 (e.g., a USB cable). In some embodiments, user device 128 can transfer power to ATM 102 (or vice versa) via USB link 130. In some embodiments, ATM 102 may include a battery backup unit (BBU) that enables ATM 102 to function when its main power source is interrupted, for example, as a result of a hurricane or other natural disaster. In some embodiments, ATM 102 may be configured to recharge its backup battery using PoweredUSB from link 130. Thus, embodiments of the present disclosure may allow users to transact with ATMs that have lost both power and network connectivity.

Once the P2P connection 130 is established, ATM 102 can communicate with server 104 indirectly by sharing the user device's network connection 116. In some embodiments, a VPN may be established between ATM 102 and server device 104. In some embodiments, the VPN connection may be terminated at user device 112, allowing app 128 to monitor and restrict data flow between the ATM 102 and server device 104.

In some embodiments, app 128 may restrict the use of the P2P connection 130 to a single ATM transaction or a series of transactions associated with a single ATM session. Here, app 128 may monitor data flowing between ATM 102 and server 104 device, and block any data that is not associated with the permitted transaction/session. In some embodiments, app 128 may block any ATM transactions that are not associated with a bank account associated (or "linked") with the user device. For example, before tethering can be used, app 128 may require the user to enter a username and password associated with the user's bank account. App 128 can then retrieve the user's account information from server device 104 and use the account information to allow or block transaction data sent by ATM 102. In some embodiments, app 128 may automatically terminate the P2P connection 130 when the permitted ATM transaction or session completes. In other embodiments, ATM 102 may terminate the P2P connection when the transaction/session is complete.

In some embodiments, app 128 may include a map UI 128b. Map UI 128b may be configured to display the location of ATMs overlaid on a mapping interface. The location of the ATMs may be retrieved from server device 104 or other external data source. In some embodiments, map UI 128b may display status and/or capability information for each ATM, such as which ATMs are online/offline, and which ATMs are tetherable.

In addition to the ATM locating and tethering functionality described herein, app 128 may provide various other banking-related features, such as the ability to view the user's current balance and transaction history, deposit checks, and contact customer support. In some embodiments, app 128 and/or user device 112 may require that the user authenticate themselves before they can use certain features described herein. For example, the user may be required to enter a passcode or pass a biometric check, such as a thumbprint or facial comparison. In some embodiments, app 128 may be provided by a financial institution, such as CAPITAL ONE™.

Figure 2A:
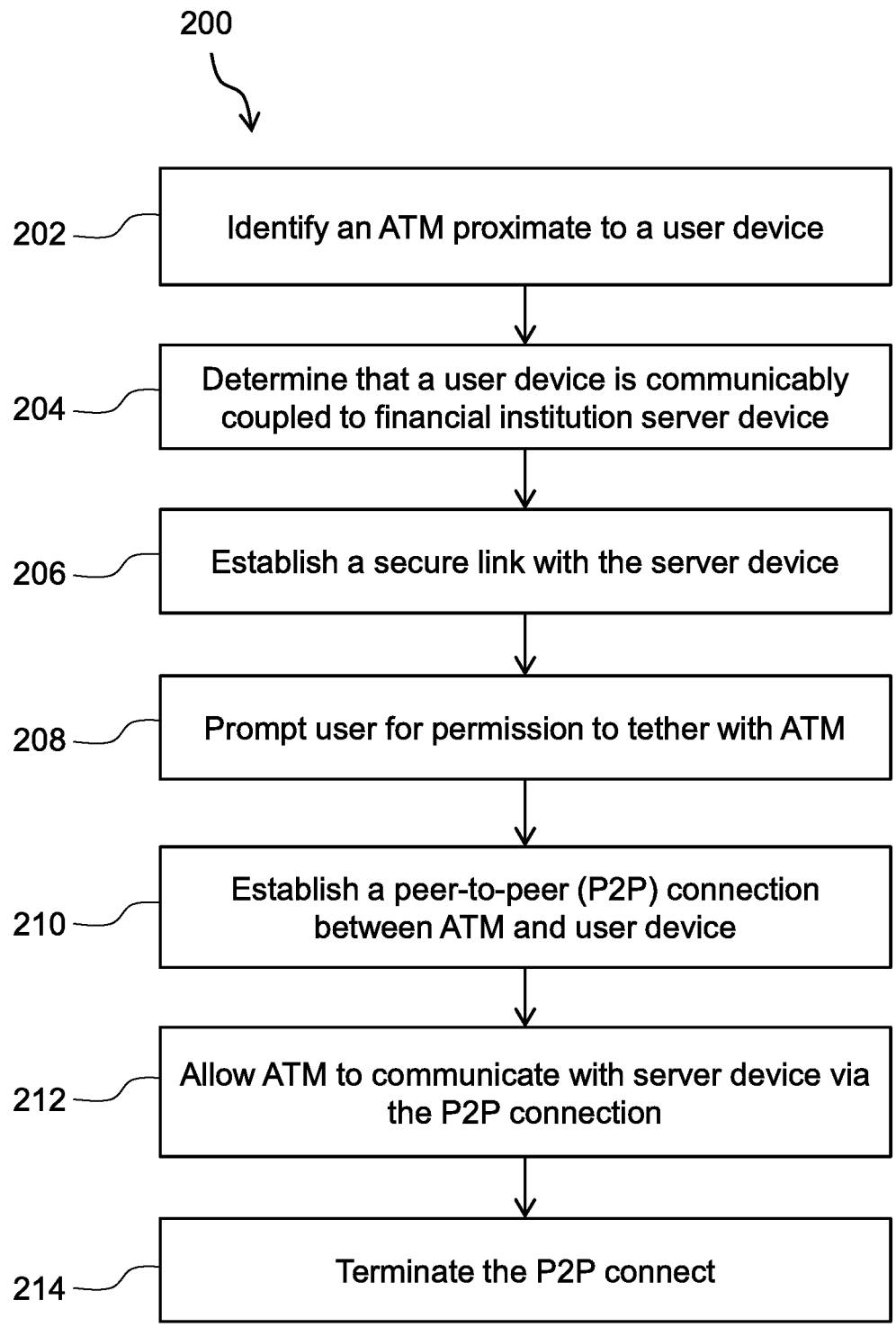
FIGS. 2A and 2B are flow diagrams showing processing that may occur within the system of FIGS. 1A and 1B, according to some embodiments of the present disclosure.

Referring to FIG. 2A, a method 200 may be used to tether an ATM to a user device, according to some embodiments of the present disclosure. In some embodiments, method 200 may be performed by an app running on a user device, such as app 128 of FIG. 1B.

At block 202, an ATM proximate to the user device may be identified. In some embodiments, this can include determining a current location for a user's device using a location sensor, and correlating the device's current location with a list of known ATM locations. In some embodiments, identifying a nearby ATM can include determining that the known location of the ATM is within a predetermined radius of the user device.

In some embodiments, block 202 can include determining that the ATM is "offline," meaning that, for example, the ATM is unable to communicate with a financial institution server device, such as server device 104 of FIG. 1B. To determine if an ATM is offline, status information received from an external source (e.g., the financial institution) may be used. In some embodiments, the offline ATM may be determined by detecting an ATM within range of the user's device and accessible to tethering (e.g., by detecting a Bluetooth or Wi-Fi signal transmitted from the ATM). In some embodiments, the user may determine that the ATM is offline based on a visual inspection of the ATM. For example, an ATM may be configured to display a message or instructions after detecting that it has connectivity with the server device.

At block 204, a determination can be made as to whether the user device is communicably coupled to the server device over a secure link. If it is not, at block 206, such a secure link with the server device may be established.

At block 208, after a secure connection has been established between the user device and the server device, a user may be prompted for permission to tether with the identified ATM. In some embodiments, an app running on the user's device may automatically open or display a preferences UI that includes controls for permitting tethering with the ATM. In some embodiments, the preferences UI may include controls for entering information (e.g., Bluetooth or Wi-Fi settings) needed to establish a P2P connection between the user device and the ATM.

At block 210, a secure P2P connection may be established between the user device and the ATM, allowing the ATM to share the user device's Internet connection for communicating with a server device. In some embodiments, a VPN may be established between the ATM and the server device. The VPN connection may be terminated at the ATM or, in some embodiments, at the user's device. In some embodiments, the app running on the user's device may restrict the ATM's tethering to a single ATM transaction or session. In some embodiments, the app may block any ATM transactions that are not associated with a bank account associated with the user device.

At block 212, the ATM can communicate one or more ATM transactions to the server device via the ATM's secure P2P connection with the user device. At block 214, the P2P connection between the ATM and the user device may be terminated. In some embodiments, the user device (or the app running thereon) may automatically terminate the P2P connection when an ATM transaction/session completes. In other embodiments, ATM may terminate the P2P connection when the transaction/session completes.

Figure 2B:
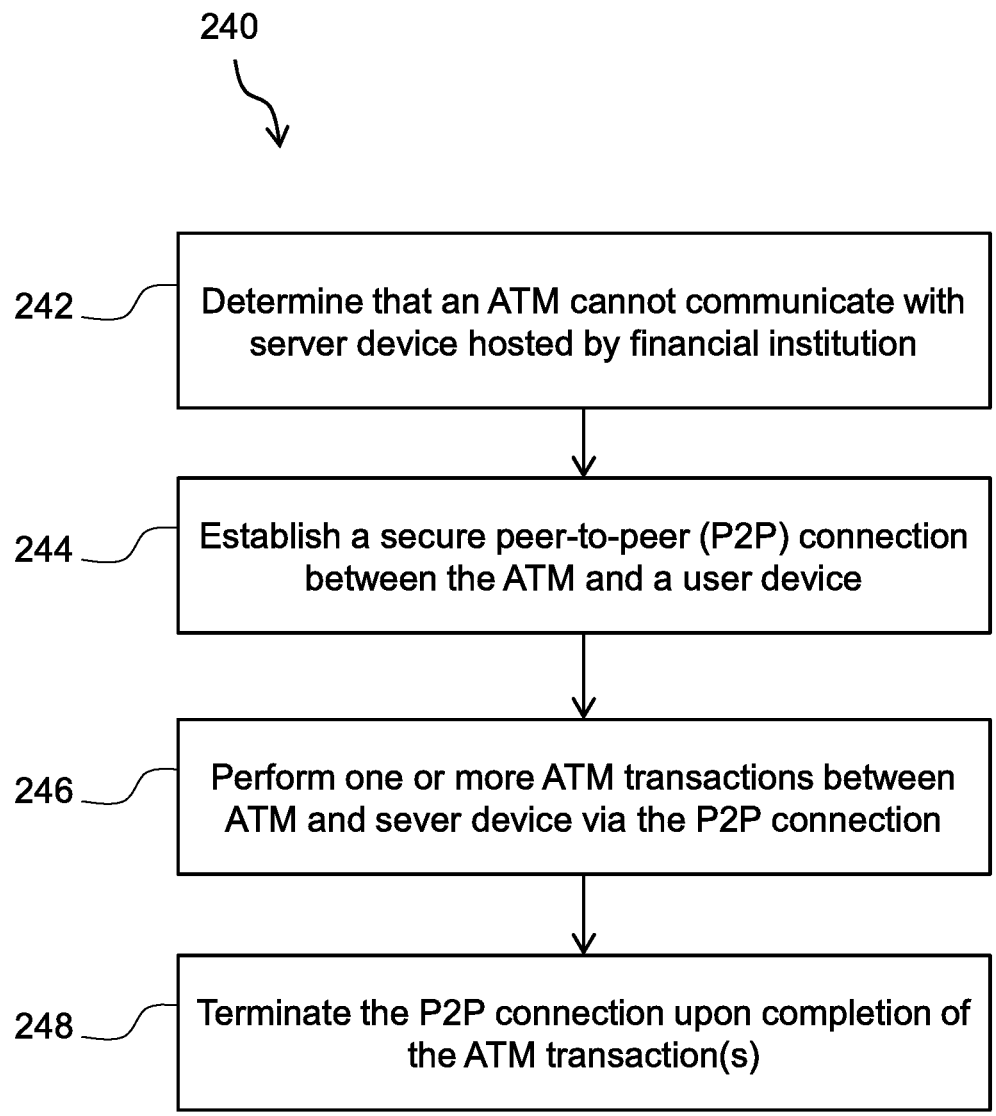

Referring to FIG. 2B, a method 240 may be used to tether an ATM to a user device, according to some embodiments of the present disclosure. In some embodiments, method 240 may be performed by an ATM, such as ATM 102 of FIG. 1B. A skilled artisan will understand that method 240 FIG. 2B can be performed, in whole or in part, in tandem with method 200 of FIG. 2A. Thus, various embodiments described above in the context of FIG. 2A may also apply herein.

At block 242, the ATM can determining whether it has lost communication with a server device, such as server device 104 of FIG. 1B. At block 244, in response to determining that the ATM cannot communicate with the server device, a secure peer-to-peer connection can be established between the ATM and a user device. At block 246, in response to establishing the secure P2P connection, the ATM may perform one or more transactions with the server device via the secure P2P connection. At block 248, the P2P connection between the ATM and the user device may be terminated. In some embodiments, the ATM and/or the user device may automatically terminate the P2P connection when a designated ATM transaction or session completes.

Figure 3:
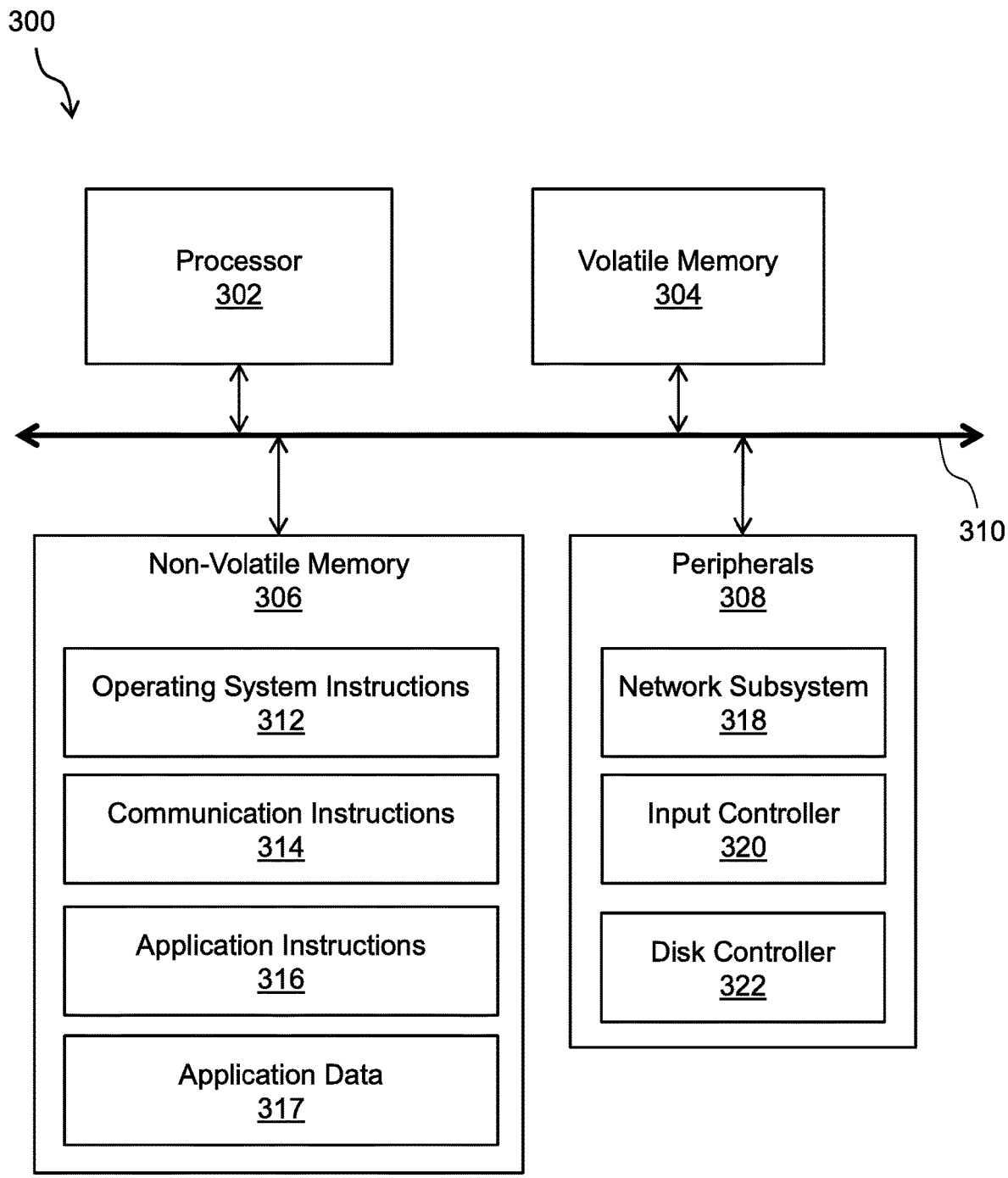
FIG. 3 is a block diagram of a computing device that may form part of an ATM or a server device, according to some embodiments of the present disclosure.

FIG. 3 shows an illustrative computing device 300 that may implement various features and processes as described herein. In some embodiments, computing device 300 may form part of an ATM, such as ATM 102 of FIG. 1. In some embodiments, computing device 300 may form part of a server device, such as server device 104 in FIG. 1. Computing device 300 may be implemented on any electronic device that runs software applications derived from compiled instructions, including without limitation personal computers, servers, smart phones, media players, electronic tablets, game consoles, email devices, etc. In some implementations, the computing device 300 may include one or more processors 302, volatile memory 304, non-volatile memory 306, and one or more peripherals 308. These components may be interconnected by one or more computer buses 310.

Processor(s) 302 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 310 may be any known internal or external bus technology, including but not limited to ISA, EISA, PCI, PCI Express, NuBus, USB, Serial ATA or FireWire. Volatile memory 304 may include, for example, SDRAM. Processor 302 may receive instructions and data from a read-only memory or a random access memory or both. The essential elements of a computer may include a processor for executing instructions and one or more memories for storing instructions and data.

Non-volatile memory 306 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 306 may store various computer instructions including operating system instructions 312, communication instructions 314, application instructions 316, and application data 317. Operating system instructions 312 may include instructions for implementing an operating system (e.g., Mac OS®, Windows®, or Linux). The operating system may be multi-user, multiprocessing, multitasking, multithreading, real-time, and the like. Communication instructions 314 may include network communications instructions, for example, software for implementing communication protocols, such as TCP/IP, HTTP, Ethernet, telephony, etc.

Peripherals 308 may be included within the server device 300 or operatively coupled to communicate with the sever device 300. Peripherals 308 may include, for example, network interfaces 318, input devices 320, and storage devices 322. Network interfaces may include for example an Ethernet or WiFi adapter. Input devices 320 may be any known input device technology, including but not limited to a keyboard (including a virtual keyboard), mouse, track ball, and touch-sensitive pad or display. Storage devices 322 may include one or more mass storage devices for storing data files; such devices include magnetic disks, such as internal hard disks and removable disks; magneto-optical disks; and optical disks.

Figure 4:
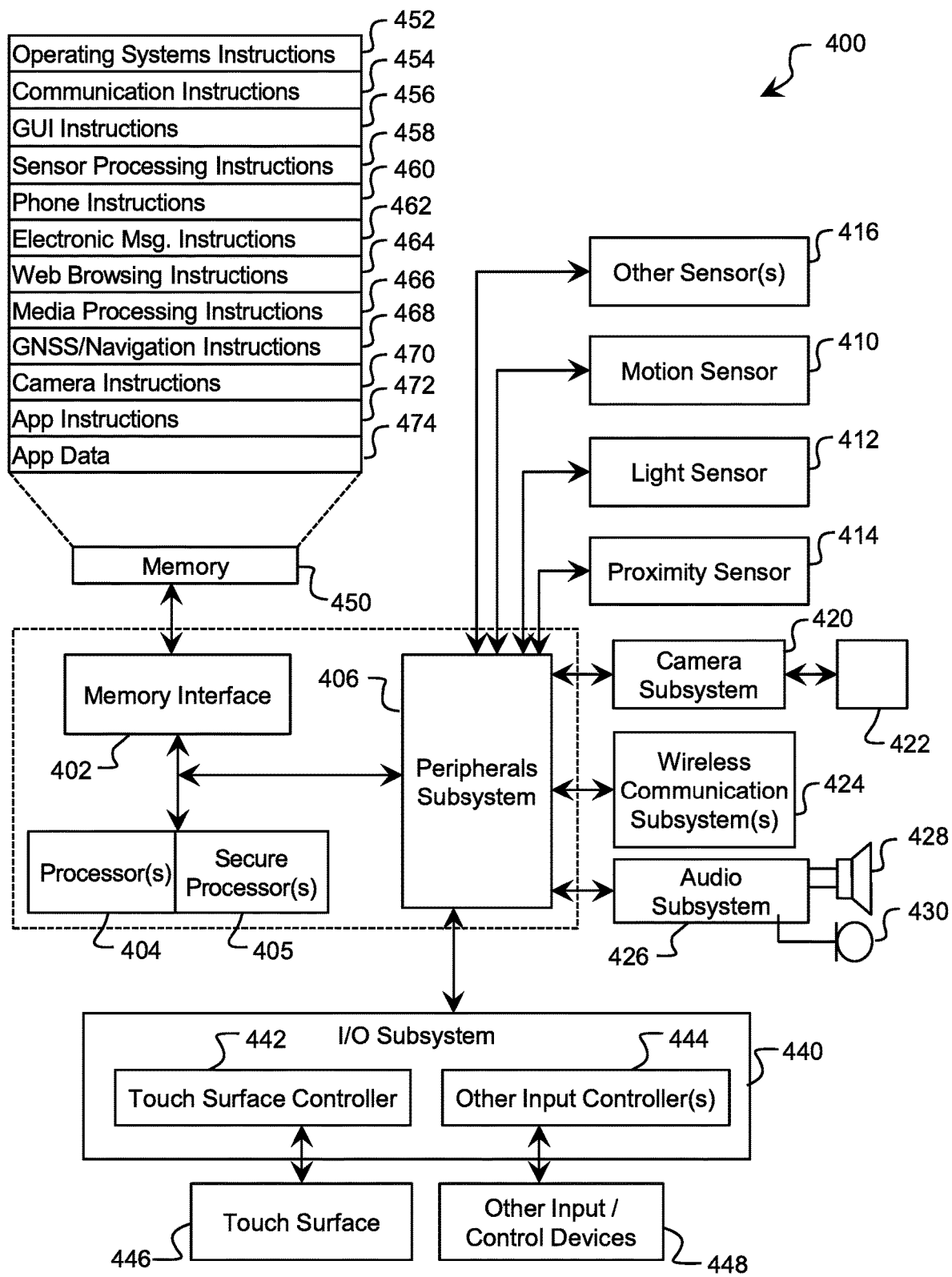
FIG. 4 is a block diagram of a user device, according to some embodiments of the present disclosure.

FIG. 4 shows a user device 400, according to an embodiment of the present disclosure. The illustrative user device 400 may include a memory interface 402, one or more data processors, image processors, central processing units 404, and/or secure processing units 405, and a peripherals interface 406. The memory interface 402, the one or more processors 404 and/or secure processors 405, and/or the peripherals interface 406 may be separate components or may be integrated in one or more integrated circuits. The various components in the user device 400 may be coupled by one or more communication buses or signal lines.

Sensors, devices, and subsystems may be coupled to the peripherals interface 406 to facilitate multiple functionalities. For example, a motion sensor 410, a light sensor 412, and a proximity sensor 414 may be coupled to the peripherals interface 406 to facilitate orientation, lighting, and proximity functions. Other sensors 416 may also be connected to the peripherals interface 406, such as a global navigation satellite system (GNSS) (e.g., GPS receiver), a temperature sensor, a biometric sensor, magnetometer, or other sensing device, to facilitate related functionalities.

A camera subsystem 420 and an optical sensor 422, e.g., a charged coupled device (CCD) or a complementary metal-oxide semiconductor (CMOS) optical sensor, may be utilized to facilitate camera functions, such as recording photographs and video clips.

Communication functions may be facilitated through one or more wired and/or wireless communication subsystems 424, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 424. The specific design and implementation of the communication subsystems 424 may depend on the communication network(s) over which the user device 400 is intended to operate. For example, the user device 400 may include communication subsystems 424 designed to operate over a GSM network, a GPRS network, an EDGE network, a WiFi or WiMax network, and a Bluetooth™ network. For example, the wireless communication subsystems 424 may include hosting protocols such that the device 400 can be configured as a base station for other wireless devices and/or to provide a WiFi service.

An audio subsystem 426 may be coupled to a speaker 428 and a microphone 430 to facilitate voice-enabled functions, such as speaker recognition, voice replication, digital recording, and telephony functions. The audio subsystem 426 may be configured to facilitate processing voice commands, voiceprinting, and voice authentication, for example.

The I/O subsystem 440 may include a touch-surface controller 442 and/or other input controller(s) 444. The touch-surface controller 442 may be coupled to a touch surface 446. The touch surface 446 and touch-surface controller 442 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 446.

The other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of the speaker 428 and/or the microphone 430.

In some implementations, a pressing of the button for a first duration may disengage a lock of the touch surface 446; and a pressing of the button for a second duration that is longer than the first duration may turn power to the user device 400 on or off. Pressing the button for a third duration may activate a voice control, or voice command, module that enables the user to speak commands into the microphone 430 to cause the device to execute the spoken command. The user may customize a functionality of one or more of the buttons. The touch surface 446 can, for example, also be used to implement virtual or soft buttons and/or a keyboard.

In some implementations, the user device 400 may present recorded audio and/or video files, such as MP3, AAC, and MPEG files. In some implementations, the user device 400 may include the functionality of an MP3 player, such as an iPod™. The user device 400 may, therefore, include a 36-pin connector and/or 8-pin connector that is compatible with the iPod. Other input/output and control devices may also be used.

The memory interface 402 may be coupled to memory 450. The memory 450 may include high-speed random access memory and/or non-volatile memory, such as one or more magnetic disk storage devices, one or more optical storage devices, and/or flash memory (e.g., NAND, NOR). The memory 450 may store an operating system 452, such as Darwin, RTXC, LINUX, UNIX, OS X, WINDOWS, or an embedded operating system such as VxWorks.

The operating system 452 may include instructions for handling basic system services and for performing hardware dependent tasks. In some implementations, the operating system 452 may be a kernel (e.g., UNIX kernel). In some implementations, the operating system 452 may include instructions for performing voice authentication.

The memory 450 may also store communication instructions 454 to facilitate communicating with one or more additional devices, one or more computers and/or one or more servers. The memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Navigation instructions 468 to facilitate GNSS and navigation-related processes and instructions; and/or camera instructions 470 to facilitate camera-related processes and functions. Memory 450 may store app instructions 472 and data 474, such as instructions and data used by app 128 in FIG. 1B.

Each of the above identified instructions and applications may correspond to a set of instructions for performing one or more functions described herein. These instructions need not be implemented as separate software programs, procedures, or modules. The memory 450 may include additional instructions or fewer instructions. Furthermore, various functions of the user device 400 may be implemented in hardware and/or in software, including in one or more signal processing and/or application specific integrated circuits.

In some embodiments, processor 404 may perform processing including executing instructions stored in memory 450, and secure processor 405 may perform some processing in a secure environment that may be inaccessible to other components of user device 400. For example, secure processor 405 may include cryptographic algorithms on board, hardware encryption, and physical tamper proofing. Secure processor 405 may be manufactured in secure facilities. Secure processor 405 may encrypt data/challenges from external devices. Secure processor 405 may encrypt entire data packages that may be sent from user device 400 to the network. Secure processor 405 may separate a valid user/external device from a spoofed one, since a hacked or spoofed device may not have the private keys necessary to encrypt/decrypt, hash, or digitally sign data, as described herein.

Methods described herein may represent processing that occurs within, for example, the system 100 of FIG. 1. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for improved reliability in a bank computer network, the method comprising:
    identifying an automated teller machine (ATM) proximate to a user device;
    determining whether the user device is communicably coupled to a server device over a secure link, the server device hosted by a financial institution and capable of processing ATM transactions;
    establishing a secure link with the server device in response to determining the user device is not communicably coupled with the server device;
    prompting a user for permission to tether with the ATM in response to determining the user device is communicably coupled with the server device or determining the secure link has been established;
    receiving, via an input device, an indication of a response to the prompt for permission to tether with ATM; and
    establishing a secure peer-to-peer (P2P) connection between the ATM and the user device in response to the response indicating that a user permits tethering with the ATM,
    wherein the ATM is configured to communicate ATM transactions with the server device via the P2P connection.

2. The method of claim 1 wherein identifying the ATM proximate to the user device comprises:
    determining a location of the user device using a location sensor; and
    identifying one or more ATMs having a known location within a predetermined radius of the location of the user device.

3. The method of claim 1 wherein prompting the user for permission to tether with the ATM comprises prompting the user for permission to tether with the ATM for a designated ATM transaction or session, wherein the method comprises:
    detecting completion of the designated ATM transaction or session; and
    terminating the P2P connection in response to detecting completion of the designated ATM transaction or session.

4. The method of claim 1 wherein establishing the secure P2P connection comprises at least one of the following:
    creating a P2P Wi-Fi network between the ATM and the user device;
    establishing a Bluetooth connection between the ATM and the user device; and
    establishing a USB connection between the ATM and the user device.

5. The method of claim 1 wherein the server device comprises an ATM host or an ATM controller.

6. The method of claim 1 wherein prompting the user for permission to tether with the ATM comprises presenting a preferences user interface (UI) comprising one or more controls for permitting tethering to the ATM, and wherein receiving the indication of a response to the prompt for permission to tether with ATM comprises receiving the indication via the preferences UI.

7. A method for improved reliability in a bank computer network, the method comprising:
    determining, by an automated teller machine (ATM), whether the ATM can communicate with a server device, the server device hosted by a financial institution and capable to perform one or more ATM transactions;
    in response to determining that the ATM cannot communicate with the server device, permitting secure peer-to-peer (P2P) connections between the ATM and authorized user devices, the authorized user devices including at least a first user device configured to:
        establish a secure link with a server device;
        prompt a user of the first user device for permission to tether with the ATM in response to determining the ATM cannot communicate with the server device,
        receive, via an input device, an indication of a response to the prompt for permission to tether with ATM, and
        establish a first secure P2P connection between the first user device and the ATM in response to the response indicating that the user permits tethering with the ATM; and
    in response to the first user device establishing the first secure P2P connection, performing an ATM transaction between the ATM and the server device via the first secure P2P connection.

8. The method of claim 7 comprising:
    in response to determining that the ATM cannot communicate with the server device, displaying, on a display device, instructions for establishing the secure P2P connections between the user devices and the ATM.

9. The method of claim 7 wherein the first user device is configured to:
    determine a location of the first user device using a location sensor;
    identify one or more ATMs having a known location within a predetermined radius of the location of the first user device; and
    identify the ATM from among the one or more identified ATMs.

10. The method of claim 7 comprising:
    detecting completion of the ATM transaction; and
    terminating the P2P connection in response to detecting completion of the ATM transaction.

11. The method of claim 7 wherein establishing the first secure P2P connection comprises at least one of:
    creating a P2P Wi-Fi network between the ATM and the first user device;
    establishing a Bluetooth connection between the ATM and the first user device; and
    establishing a USB connection between the ATM and the first user device.

12. The method of claim 7 wherein the server device comprises an ATM host or an ATM controller.

13. The method of claim 7 wherein the first user device is configured to:
    present a preferences user interface (UI) to the user, the preferences UI comprising one or more controls for permitting tethering to the ATM; and
    receive the indication of a response to the prompt for permission to tether with ATM via the preferences UI.

14. A system for improved reliability in a bank computer network, the system comprising:
    a processor; and
    a non-volatile memory storing instructions that when executed on the processor cause the processor to:
        identify an automated teller machine (ATM) proximate to a user device;
        determine whether the user device is communicably coupled to a server device over a secure link, the server device hosted by a financial institution and capable to perform one or more ATM transactions;
        establish a secure link with the server device in response to determining the user device is not communicably coupled with the server device;
        prompt a user for permission to tether with the ATM in response to determining the user device is communicably coupled with the server device or determining the secure link has been established;
        receive, via an input device, an indication of a response to the prompt for permission to tether with ATM; and
        establish a secure peer-to-peer (P2P) connection between the ATM and the user device in response to the response indicating that a user permits tethering with the ATM,
    wherein the ATM is configured to communicate ATM transactions with the server device via the P2P connection.

15. The system of claim 14 wherein the instructions that when executed on the processor cause the processor to:
    determine a location of the user device using a location sensor;
    identify one or more ATMs having a known location within a predetermined radius of the location of the user device; and
    identify the ATM proximate to the user device from the one or more identified ATMs.

16. The system of claim 14 wherein the instructions that when executed on the processor cause the processor to:
    detect completion of an ATM transaction performed by the ATM; and
    terminate the P2P connection in response to detecting completion of the ATM transaction.

17. The system of claim 14 wherein the instructions that when executed on the processor cause the processor to:
    presenting a preferences user interface (UI) comprising one or more controls for permitting tethering to the ATM; and receive the indication of a response to the prompt for permission to tether with ATM via the preferences UI.

18. The system of claim 14 wherein establishing the secure P2P connection comprises at least one of the following:
creating a P2P Wi-Fi network between the ATM and the user device;
establishing a Bluetooth connection between the ATM and the user device; and
establishing a USB connection between the ATM and the user device.

\* \* \* \* \*